United States Patent
Yan et al.

(10) Patent No.: US 12,025,258 B2
(45) Date of Patent: Jul. 2, 2024

(54) BONDED MULTILAYER ARTICLE

(71) Applicants: Dow Global Technologies LLC, Midland, MI (US); Dow Silicones Corporation, Midland, MI (US)

(72) Inventors: Ni Yan, Lake Jackson, TX (US); Bhawesh Kumar, Lake Jackson, TX (US); Brian J. Swanton, Saginaw, MI (US); Lauren Tonge, Midland, MI (US); Christophe R. Laroche, Lake Jackson, TX (US); Mark Brown, II, Richwood, TX (US)

(73) Assignees: Dow Global Technologies LLC, Midland, MI (US); Dow Silicones Corporation, Midland, MI (US)

( * ) Notice: Subject to any disclaimer, the term of this patent is extended or adjusted under 35 U.S.C. 154(b) by 297 days.

(21) Appl. No.: 17/414,708

(22) PCT Filed: Dec. 18, 2019

(86) PCT No.: PCT/US2019/067031
§ 371 (c)(1),
(2) Date: Jun. 16, 2021

(87) PCT Pub. No.: WO2020/131985
PCT Pub. Date: Jun. 25, 2020

(65) Prior Publication Data
US 2022/0065387 A1    Mar. 3, 2022

Related U.S. Application Data

(60) Provisional application No. 62/782,101, filed on Dec. 19, 2018.

(51) Int. Cl.
*F16L 59/14* (2006.01)
*B29C 39/00* (2006.01)
(Continued)

(52) U.S. Cl.
CPC ............ *F16L 59/14* (2013.01); *B29C 39/003* (2013.01); *B29C 39/123* (2013.01); *B32B 1/08* (2013.01);
(Continued)

(58) Field of Classification Search
CPC ... F16L 59/14; B32B 1/08; B32B 7/12; B32B 25/08; B32B 25/20; B32B 38/008;
(Continued)

(56) References Cited

U.S. PATENT DOCUMENTS 3,419,593 A    12/1968  Willing
3,715,334 A     2/1973  Karstedt
(Continued)

FOREIGN PATENT DOCUMENTS

CN    2824774    10/2006
CN    201743471   2/2011
(Continued)

OTHER PUBLICATIONS

Carrino "Cold plasma treatment of polypropylene surface: a study on wettability and adhesion." Journal of Materials Processing Technology, 2002, p. 373-382.
(Continued)

*Primary Examiner* — Michael C Miggins

(57) ABSTRACT

A bonded multilayer article including: (a) at least one first layer of a silicone-containing rubber substrate material bonded to (b) at least one second layer of a substrate material bondable to the first layer; wherein at least a portion of the surface of the first layer is activated for adhesion to increase the bond strength of the first layer to a second layer such that the bond strength of the first layer bonded to the second layer is increased; and a process for producing the above bonded multilayer article.

10 Claims, 3 Drawing Sheets

(51) Int. Cl.
*B29C 39/12* (2006.01)
*B29L 23/00* (2006.01)
*B32B 1/08* (2006.01)
*B32B 7/12* (2006.01)
*B32B 25/08* (2006.01)
*B32B 25/20* (2006.01)
*B32B 38/00* (2006.01)

(52) U.S. Cl.
CPC .............. *B32B 7/12* (2013.01); *B32B 25/08* (2013.01); *B32B 25/20* (2013.01); *B32B 38/0008* (2013.01); *B29L 2023/225* (2013.01); *B32B 2307/304* (2013.01); *B32B 2307/308* (2013.01); *B32B 2307/748* (2013.01); *B32B 2597/00* (2013.01)

(58) Field of Classification Search
CPC ........ B32B 2307/304; B32B 2307/308; B32B 2307/748; B32B 2597/00
See application file for complete search history.

(56) References Cited

U.S. PATENT DOCUMENTS

| | | | |
|---|---|---|---|
| 3,814,730 A | 6/1974 | Karstedt | |
| 4,098,856 A | 7/1978 | Rosenau | |
| 4,103,431 A | 8/1978 | Levinson | |
| 4,312,693 A | 1/1982 | Salensky et al. | |
| 4,421,904 A | 12/1983 | Eckberg et al. | |
| 4,677,141 A | 6/1987 | Cornelius et al. | |
| 4,774,281 A * | 9/1988 | Chaffee | C08L 83/04 524/588 |
| 4,800,124 A * | 1/1989 | Davis | H01B 3/46 524/588 |
| 5,147,725 A | 9/1992 | Pinchuk | |
| 5,364,662 A | 11/1994 | Domenico et al. | |
| 5,830,970 A | 11/1998 | Cobb et al. | |
| 6,201,217 B1 | 3/2001 | Moon et al. | |
| 6,408,841 B1 | 6/2002 | Hirath et al. | |
| 6,605,734 B2 | 8/2003 | Roy et al. | |
| 6,892,817 B2 | 5/2005 | Janoff | |
| 8,530,533 B2 | 9/2013 | Lehmann et al. | |
| 9,216,558 B2 | 12/2015 | Padsalgikar | |
| 9,751,975 B2 | 9/2017 | Cruce et al. | |
| 9,829,146 B2 | 11/2017 | Han et al. | |
| 2004/0118838 A1 | 6/2004 | Park | |
| 2015/0290676 A1* | 10/2015 | Shepherd | C08J 7/042 427/535 |
| 2017/0247590 A1 | 8/2017 | Zheng et al. | |
| 2020/0165490 A1* | 5/2020 | Kryger | C08G 59/00 |
| 2021/0062048 A1* | 3/2021 | Galush | C09J 7/38 |

FOREIGN PATENT DOCUMENTS

| | | |
|---|---|---|
| CN | 202619136 | 12/2012 |
| CN | 202619429 | 12/2012 |
| CN | 202835494 | 3/2013 |
| CN | 202908542 | 5/2013 |
| CN | 202981558 | 6/2013 |
| CN | 103231480 | 8/2013 |
| CN | 103265812 | 8/2013 |
| CN | 103554420 | 2/2014 |
| CN | 103554421 | 2/2014 |
| CN | 103654439 | 3/2014 |
| CN | 104235896 | 12/2014 |
| CN | 104237299 | 12/2014 |
| CN | 204006189 | 12/2014 |
| CN | 204026763 | 12/2014 |
| CN | 204026769 | 12/2014 |
| CN | 104276851 | 1/2015 |
| CN | 204278350 | 4/2015 |
| CN | 204318407 | 5/2015 |
| CN | 204838895 | 12/2015 |
| CN | 105318369 | 2/2016 |
| CN | 105418877 | 3/2016 |
| CN | 105884997 | 8/2016 |
| CN | 205580212 | 9/2016 |
| CN | 205991110 | 3/2017 |
| CN | 205997479 | 3/2017 |
| CN | 206080123 | 4/2017 |
| EP | 0183379 | 6/1986 |
| EP | 0361921 | 4/1990 |
| EP | 1275894 | 1/2003 |
| EP | 1793175 | 6/2007 |
| EP | 1983034 | 10/2008 |
| EP | 2215162 | 8/2010 |
| GB | 2207391 | 2/1989 |
| GB | 2499379 | 8/2013 |
| JP | 11241428 | 9/1999 |
| JP | 2003322345 | 11/2003 |
| JP | 2014228114 | 12/2014 |
| JP | 2015168794 | 9/2015 |
| KR | 20111121764 | 11/2011 |
| SG | 192822 | 9/2013 |
| WO | 0014146 | 3/2000 |
| WO | 03004927 | 1/2003 |
| WO | 2007039763 | 4/2007 |
| WO | 2008002532 | 1/2008 |
| WO | 2013178992 | 12/2013 |
| WO | 2014046310 | 3/2014 |
| WO | 2014058073 A2 | 4/2014 |
| WO | 2015065769 | 5/2015 |
| WO | 2016094393 | 6/2016 |
| WO | 2016153664 A1 | 9/2016 |
| WO | 2017027199 A1 | 2/2017 |
| WO | 2018229479 A1 | 12/2018 |
| WO | 2018234783 A1 | 12/2018 |
| WO | 2019024432 A1 | 2/2019 |

OTHER PUBLICATIONS

Roth "Surface Functionalization of Silicone Rubber for Permanent Adhesion Improvement." Langmuir, 2008, p. 12603-12611, vol. 24, No. 21.
PCT/US2019/067031, International Search Report and Written Opinion with a mailing date of Apr. 30, 2020.
PCT/US2019/067031, International Preliminary Report on Patentability with a mailing date of Jun. 16, 2021.
Office Action from corresponding Chinese Application: 201980087260.8 with a mailing date of Apr. 12, 2023.

* cited by examiner

BONDED MULTILAYER ARTICLE

FIELD

The present invention relates to a bonded multilayer article and a process for preparing the bonded multilayer article; and more specifically, the present invention relates to a bonded multilayer article of a first layer of a silicone-containing rubber substrate material bonded to a second layer of a substrate material bondable to the first layer.

BACKGROUND

Multilayer articles of two or more substrate layers bonded together can be used to make a variety of articles such as coatings, films, composites, molds, devices, implants, and the like for use in various applications. (see e.g., U.S. Pat. No. 5,147,725). It is also common to bond a silicon-containing rubber substrate layer to a polyurethane substrate layer to form the above multilayer article.

For example, a thermal insulation coating including a silicon-containing substrate layer bonded to a polyurethane substrate layer can be used, for example, for insulating subsea pipelines used in subsea oil drilling operations as described in EP1983034A2. The multilayer coating consisting of the two layers of a silicone (Si) rubber layer and the polyurethane (PU) layer provides the PU layer (the outer layer) bonded over the silicon layer (the inner layer) of the coating.

In another example, the silicon-containing substrate layer bonded to a polyurethane substrate layer can be used for manufacturing biomaterials, devices, articles or implants, such as long term implantable medical devices in the fields of cardiology, orthopedics, plastic surgery and gastroenterology as described in U.S. Pat. No. 9,216,558.

In still another example, polyurethane foam decorative parts can be made from a mold including a silicon rubber bonded to a polyurethane backing as described in U.S. Pat. No. 4,098,856.

Heretofore, silicone rubber substrate has proved to have a surface that is difficult to bond to other materials. For example, bonding PU to silicone rubber is often difficult due to the extremely low reactivity and free energy of the silicone rubber layer surface. A certain minimum level of bond strength has to be achieved between the PU and silicone rubber layers of such a multilayer article to provide the necessary structural integrity of such a multilayer article to be used, for example, as a thermal insulation coating at high temperatures for pipelines and equipment used in offshore drilling operations. In view of the above problems with bonding silicone rubber to PU, heretofore, various different surface treatments, such as plasma treatment, flame treatment, and primer treatment, of one or more layers of the multilayer article has been tried to improve adhesion between layers of different substrates such as silicone rubber and PU layers.

However, the known surface treatments of the prior art use various silicone materials and polyurethane materials that are not effective for adhering to each other and are not very effective for manufacturing a multilayer article such as a thermal insulation coating for pipelines used in servicing offshore oil drilling operations. Therefore, a multilayer article such as an insulation coating material that is stable in a high temperature (e.g., >160° C.) and a high pressure (e.g., >300 bar) environment; and that has flexibility for easy handling and cost efficacy would be highly favorable. Such a thermal insulation coating is still needed, for applications such as offshore oil drilling in subsea oil operations. It would be a significant advancement in the art to provide a bonded multilayer article containing a silicone layer that: (1) has a superior thermal stability than the prior art silicone rubbers and silicone-based materials; (2) has an increase in adhesion; (3) has a decreased density; (4) has an increase in abrasion resistance; (5) has a decrease in thermal conductivity; and (6) has a reduced minimum thickness requirement which can potentially reduce the cost of manufacturing the article.

SUMMARY

The present invention is directed to a bonded multilayer article including at least one first layer of a silicone-containing material bonded to at least one second layer of a material that is bondable to the first layer. While the bonded multilayer article of the present invention can be used in a variety of applications, in one preferred embodiment, the multilayer article can be used as a thermal insulation coating, particularly a thermal insulation coating for pipelines and other equipment, such as subsea pipelines, for the purpose of providing thermal insulation to the pipelines. For example, a high consistency silicone rubber (HCR) can be used as the at least one first layer and a glass syntactic polyurethane (GSPU) can be used as the at least one second layer. The HCR layer can be used as an inner layer and the GSPU layer can be used as an outer layer to provide a protective or thermal barrier layer for example to a pipeline. The bonded HCR-GSPU multilayer article can be used as an insulation coating, for example, as a thermal insulation coating in conjunction with subsea oil and gas production equipment, such as pipelines, wellheads and Christmas trees.

In one embodiment, the present invention provides a bonded multilayer article including: (a) at least one first layer of a silicone-containing rubber substrate material bonded to (b) at least one second layer of a substrate material bondable to the first layer; wherein the at least one first layer of a silicone-containing rubber substrate material comprises a cured high consistency silicone rubber; wherein the first layer has at least a portion of the surface of the first layer activated by a flame treatment for bonding the first layer to the second layer and for increasing the bond strength of the first layer to the second layer; and wherein the activated surface of the first layer, activated by a flame treatment, is bonded to the surface of the second layer.

In one preferred embodiment, the first layer of silicone-containing rubber substrate material has certain unique and unexpected properties such as high thermal stability in water (e.g., @ 170° C.) and increased adhesion (increased bond strength), for example, to a polyurethane material used as the second layer. In addition, the at least one first layer of a silicone-containing rubber substrate material can be a cured high consistency silicone rubber.

In another embodiment, the present invention provides a bonded multilayer article including: (a) at least one first layer of a silicone-containing rubber substrate material bonded to (b) at least one second layer of a substrate material bondable to the first layer; wherein the at least one first layer of a silicone-containing rubber substrate material comprises an uncured high consistency silicone rubber; wherein the first layer has at least a portion of the surface of the first layer activated by a flame treatment for adhering (bonding) the first layer to the second layer and for increasing the bond strength of the first layer to the second layer; and wherein the activated surface of the first layer, activated by a flame treatment, is bonded to the surface of the second layer.

In the above embodiments of the present invention, at least a portion of the surface of the at least one first layer of a silicone-containing rubber substrate material is "activated" (as defined herein) prior to adhesion to another substrate, but in preparation for adhesion to another substrate. Not only does activation provide adhesion between the two substrates but activating the surface of the first layer also provides an increase in the bond strength of the first layer to a second layer when the first layer is bonded to the second layer to form the multilayer article.

In another embodiment, the present invention is directed to a process for producing the above multilayer article.

In still another embodiment, the present invention is directed to a substrate coated with the above multilayer article used as a coating.

In yet another embodiment, the present invention is directed to a process for producing a metal pipe coated with the above multilayer coating.

In even still another embodiment, the present invention is directed to a pipeline coated with the above multilayer coating used for offshore drilling.

One objective of the present invention is to provide the industry with a layer of a silicone-containing rubber substrate material such as an HCR layer that can effectively adhere to a polyurethane material such as a GSPU layer to form a multilayer coating for pipelines and equipment that can perform, and that are stable, in a high temperature (e.g., >150° C.) and high pressure (e.g., >300 bar) environment such as an offshore subsea oil drilling operation.

DETAILED DESCRIPTION

Figure 1:
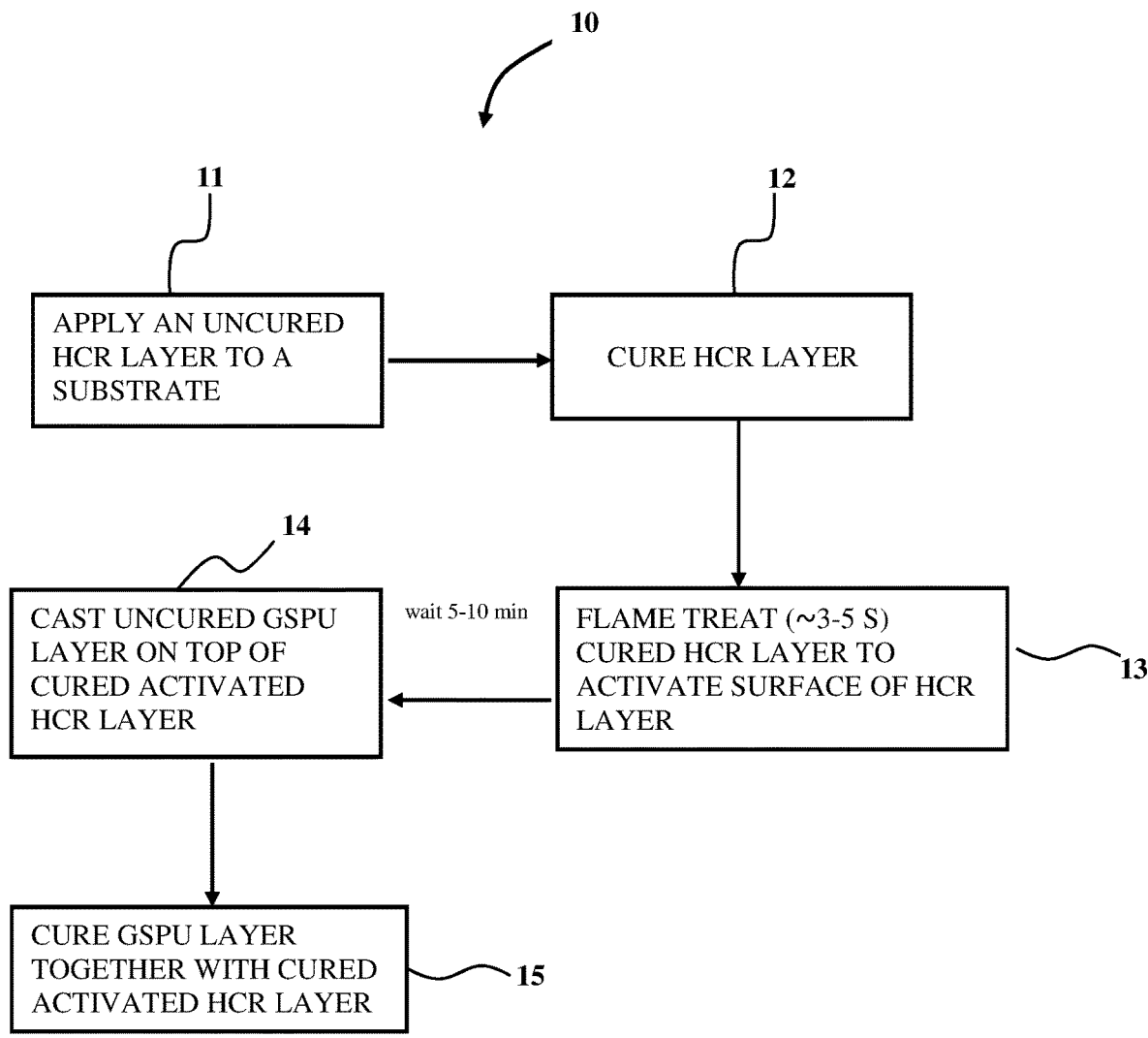
FIG. 1 is a schematic flow chart of a process of coating GSPU onto cured HCR after flame treatment.

In one broad embodiment, the present invention is directed to a bonded multilayer structure or article including: (a) at least one first layer of a silicone-containing rubber substrate material bonded to (b) at least one second layer of a substrate material bondable to the first layer. The first layer of the silicone-containing rubber substrate material can include, for example, a high consistency silicone rubber. The high consistency silicone rubber can be a cured substrate in one embodiment; or the high consistency silicone rubber can be an uncured substrate in another embodiment. The second layer of a substrate material bondable to the first layer can be a cured substrate in one embodiment; or an uncured substrate in another embodiment.

Also, the first layer has at least a portion of the surface of the first layer "activated" by a flame treatment. "Activate", "activated", "activating", or "activation", with regard to a substrate layer, herein means increased surface energy, enhanced surface hydrophilicity, and/or increased polar functional group concentration. The flame treatment is carried out before adhering the first layer to the second layer and the flame treatment is performed on the first layer in preparation for the adhesion (bonding) of the first layer to the second layer. When the first layer is bonded to the second layer, the flame treatment provides an increase in the bond strength of the first layer bonded to the second layer. The activated surface of the first layer, activated by a flame treatment, is bonded to the surface of the second layer.

In one preferred embodiment, the first layer includes a silicone-containing rubber substrate material such as an HCR material which advantageously exhibits certain unique and unexpected properties such as high thermal stability (e.g., >150° C.) and increased adhesion (increased bond strength). The HCR materials that can be used in the present invention can include, for example, the HCRs described in U.S. Ser. No. 62/781,997. The first layer is also advantageously extrudable, wrappable, and capable of being packed-in-place. The second layer of a substrate material bondable to the first layer includes, for example, a polyurethane (PU)-containing material capable of being bonded to the first layer.

In another preferred embodiment, the multilayer structure or article of the present invention includes, for example, (a) an HCR as the at least one first layer of silicone-containing rubber substrate material bonded to (b) GSPU as the at least one second layer of a substrate material bondable to the first layer.

It has been found that the first layer of silicone-containing rubber substrate material useful in the present invention can be a cured silicone-containing rubber substrate material (e.g., a cured HCR); and the surface of the first layer of cured silicone-containing material can be activated in accordance with the process of the present invention. In bonding the at least two layers above (e.g., a first and second layer) and in preparation for the adhesion of the first and second layers of material, by "activated" herein, with reference to a surface of at least one of the layers, it is meant that at least a portion of the surface of at least one of the layers is altered by applying a surface treatment, such as by flame treatment, on at least a portion of the surface of the first treated layer sufficient to increase the bond strength of the flame treated layer bonded to the other non-flame treated layer.

Some of the surface treatments that can be used in the present invention to "activate" the surface of a layer can include for example plasma treatment, flame treatment, and/or primer treatment of one or more layers of the multilayer coating of the present invention. In one preferred embodiment, the surface treatment used in the present invention includes a flame treatment.

For example, the flame treatment includes applying a flame surface treatment on at least a portion of the surface of the first layer cured silicone-containing rubber substrate material such as a HCR layer to form an "activated" surface area on at least a portion of the surface of the HCR. The flame treatment used for treating the HCR can be carried out at a temperature and at ambient conditions sufficient to bring reactive radicals to the surface of HCR surface and sufficient to induce polarized components on the HCR surface such that the surface is "activated". For example, a high temperature (e.g., up to 3,000° C.) flame treatment at ambient conditions can be used for treating the surface of the HCR layer. The temperature of flame can be generated using, for example, methane, propane, and butane. The polarized components on the HCR layer surface resulting from the flame treatment can interact with the components in the second layer, such as a GSPU layer, in preparation for adhering the GSPU layer onto the "activated" surface of the HCR layer. Once the "activated" HCR surface is contacted with the GSPU layer an effective bond is formed between the HCR and the GSPU layers to form a multilayer layer insulation coating.

Not to be bound by any particular theory, it is theorized that the high temperature flame treatment of the HCR layer leads to the formation of oxides on the surface of the HCR layer and these oxides react with the isocyanate and NCO groups on the GSPU layer. It is believed that the flame treatment can bring reactive radicals (e.g., oxygen (O)) to the surface of the HCR layer which is otherwise an inert HCR surface; and the flame treatment can induce polarized components on the HCR surface to "activate" the HCR surface in preparation for an adhesion process. The "activated" HCR surface can then interact with components in the GSPU layer; and as a result, an effective bond can be formed between the HCR and GSPU layers.

In another embodiment, the multilayer article of the present invention may include adding hollow glass microspheres (glass beads) to one or more layers of the multilayer article such as adding the glass beads to the second layer substrate material, such as the PU layer, to enhance the adhesion of the first layer to the second layer. Again, not to be bound by any particular theory, it is theorized that the glass beads present in the PU layer, the adhesion is increased because the hydroxyl groups on the surface of glass beads are theorized to interact with the reactive radicals (e.g., oxygen (O)) on the surface of the HCR layer.

It has been found that not all silicone-containing materials such as HCR have the required properties for the materials to be useful in the present invention. In general, the silicone-containing rubber substrate material of the first layer can be selected from any number of polydiorganosiloxane gums known in the art. For example, the polydiorganosiloxane gums useful in the present invention may include a polydiorganosiloxane gum having multiple units of the following Formula (I):

$$R_aSiO_{(4-a)/2} \qquad \text{Formula (I).}$$

In the above Formula (I), each R may be independently selected from an aliphatic hydrocarbyl, an aromatic hydrocarbyl, or an organyl group (that is, R can be any organic substituent group, regardless of functional type, having one free valence at a carbon atom). Saturated aliphatic hydrocarbyls can be exemplified by, but not limited to, alkyl groups such as methyl, ethyl, propyl, pentyl, octyl, undecyl and octadecyl; and cycloalkyl groups such as cyclohexyl. Unsaturated aliphatic hydrocarbyls are exemplified by, but not limited to, alkenyl groups such as vinyl, allyl, butenyl, pentenyl, cyclohexenyl and hexenyl; and alkynyl groups. Aromatic hydrocarbon groups can be exemplified by, but not limited to, phenyl, tolyl, xylyl, benzyl, styryl, and 2-phenylethyl. Organyl groups can be exemplified by, but not limited to, halogenated alkyl groups such as chloromethyl, 3-chloropropyl, and 3,3,3-trifluoropropyl; nitrogen containing groups such as amino groups, amido groups, imino groups, imido groups; oxygen containing groups such as polyoxyalkylene groups, carbonyl groups, and alkoxy groups. Further organyl groups may include sulfur containing groups, fluoro containing groups, phosphorus containing groups, boron containing groups. The subscript "a" is 0, 1, 2 or 3; however, in one embodiment, the subscript "a" can be 2 for most units.

When R is a methyl group in the above Formula (I), the siloxy unit formed may be described by a shorthand (abbreviated) nomenclature, namely—"M," "D," "T," and "Q" (further teaching on silicone nomenclature may be found in Walter Noll, Chemistry and Technology of Silicones, dated 1962, Chapter I, pages 1-9). The M unit may correspond to a siloxy unit where a=3, namely $R_3SiO_{1/2}$; the D unit may correspond to a siloxy unit where a=2, namely $R_2SiO_{2/2}$; the T unit may correspond to a siloxy unit where a=1, namely $RSiO_{3/2}$; and the Q unit may correspond to a siloxy unit where a=0, namely $SiO_{4/2}$.

Typical functional groups that can be present in the above-mentioned polydiorganosiloxane gum may include, for example, alkoxyl; alkenyl such as vinyl; alkyl such as methyl or alkyl chains up to 8 carbon atoms; and aryl such as phenyl. The functional group may be in a pendent position (on a D or T siloxy unit), or may be terminal (on an M siloxy unit).

The above-described polydiorganosiloxane gum may be selected from polydimethylsiloxanes, alkylmethylpolysiloxanes, alkylarylpolysiloxanes, and mixtures thereof. The gums may be linear, branched or cyclic; however, in one embodiment, the gums can be linear or branched. The polysiloxanes may have any suitable terminal groups, for example, the terminal groups may be trialkyl terminated, alkenyldialkyl terminated; or in another embodiment, the polysiloxanes may be terminated with any other suitable terminal group combination.

In other embodiments, the polydiorganosiloxane gum may be selected from polydimethylsiloxanes, alkylmethylpolysiloxanes, alkylarylpolysiloxanes, and mixtures thereof.

In still other embodiments, examples of polydiorganosiloxane gum useful in the present invention may include polydiorganosiloxanes containing alkenyl groups at the two terminals. These polydiorganosiloxanes can be represented by the following general Formula (II):

$$R'R''R'''SiO-(R''R'''SiO)m\text{-}SiOR'''R''R' \qquad \text{Formula (II)}$$

In Formula (II) above, each R' can be an alkenyl group, which typically contains from 2 carbon atoms to 10 carbon atoms, such as vinyl, allyl, and 5-hexenyl. R", in Formula (II) above, does not contain ethylenic unsaturation. Each R" may be the same or different; and each R" may individually be selected from monovalent saturated hydrocarbon radicals, which typically contain from 1 carbon atom to 10 carbon atoms; and monovalent aromatic hydrocarbon radicals, which typically contain from 6 carbon atoms to 12 carbon atoms. R" may be unsubstituted or substituted with one or more groups that do not interfere with the curing process of the present invention composition, such as halogen atoms. R''', in Formula (II) above, can be an R' group or an R" group as described above. The letter "m", in Formula (II), represents a degree of polymerization suitable for the polydiorganosiloxane gum to have a viscosity of at least 1,000,000 mPa·s at 25° C.

While the polydiorganosiloxane gum typically has a viscosity of at least 1,000,000 mPa·s at 25° C., because of the difficulty in measuring viscosity above these viscosity values, gums in general tend to be described by way of the gum's "Williams plasticity" values in accordance with ASTM D-926-08 as opposed to by viscosity. ASTM is ASTM International, West Conshohocken, PA, USA. In one general embodiment, the polydiorganosiloxane gum has a viscosity resulting in a Williams's plasticity of at least 30 millimeters (mm)/100 measured in accordance with ASTM D-926-08. Alternatively, in other embodiments, the polydiorganosiloxane gum can have a viscosity resulting in a Williams's plasticity of at least 50 mm/100, alternatively at least 100 mm/100, and alternatively at least 125 mm/100. In still another embodiment, alternatively the polydiorganosiloxane gum can have a viscosity resulting in a Williams's plasticity of from 125 mm/100 to 300 mm/100. The above Williams plasticity values can be measured in accordance with ASTM D-926-08.

To handle, apply and bond the first layer of silicone-containing rubber material to the second layer of a substrate material bondable to the first layer; the silicone-containing rubber material can be typically used in combination with a reinforcing filler material and provided in the form of a base composition which includes at least (i) the polydiorganosiloxane gum and (ii) a reinforcing filler material. Other optional compounds, additives or ingredients for a particular intended function or use can be added to the base composition if desired.

The polydiorganosiloxane gum, component (i), has been described above.

The reinforcing filler, component (ii) of the base composition can be a reinforcing filler such as finely divided silica. Silica and other reinforcing fillers are often treated with one or more known filler treating agents to prevent a phenomenon referred to as "creping" or "crepe hardening" during processing of the curable composition.

In a preferred embodiment, finely divided forms of silica can be used as the reinforcing filler in the present invention, e.g. precipitated silica, fumed silica and/or colloidal silica. For example, colloidal silicas can be used because of the colloidal silicas' relatively high surface area, which is typically at least 50 $m^2/g$ (BET method in accordance with ISO 9277: 2010). In another embodiment, fillers having a surface area of from 50 $m^2/g$ to 450 $m^2/g$ (BET method in accordance with ISO 9277: 2010) can be used; and alternatively, a surface area of from 50 $m^2/g$ to 300 $m^2/g$ (BET method in accordance with ISO 9277:2010), can be used.

The amount of polydiorganosiloxane gum present in the base composition can be, for example, from 30 wt % to 95 wt % in one embodiment and alternatively, of from 30 wt % to 80 wt %. The amount of reinforcing filler, e.g. finely divided silica, in the base composition herein can be, for example, from 5 wt % to 70 wt %, and alternatively, of from 5 wt % to 60 wt %, alternatively, of from 5 wt % to 55 wt % and alternatively, of from 5 wt % to 50 wt % in another embodiment. In some instances, the amount of reinforcing filler may be of from 7.5 wt % to 30 wt % in still another embodiment, and alternatively, from 10 wt % to 30 wt % in yet another embodiment, based on the weight of the composition.

When the reinforcing filler used in the present invention is naturally hydrophilic (e.g. an untreated silica filler), the filler can be typically treated with a treating agent to render the filler hydrophobic. These surface modified reinforcing fillers do not clump, and can be homogeneously incorporated into a polydiorganosiloxane gum as the surface treatment makes the fillers easily wetted by the polydiorganosiloxane gum. This results in improved room temperature mechanical properties of the compositions and resulting cured materials cured therefrom.

The surface treatment of the filler may be undertaken prior to introducing the filler in the composition or in situ (i.e. in the presence of at least a portion of the other ingredients of the composition herein by blending these ingredients together at room temperature or above until the filler is completely treated). Typically, untreated reinforcing filler can be treated in situ with a treating agent in the presence of the polydiorganosiloxane gum, such that thereafter a mixture of a silicone rubber base material is obtained, to which other ingredients may be added.

Typically, the reinforcing filler may be surface treated with any low molecular weight organosilicon compounds disclosed in the art applicable to prevent creping of organosiloxane compositions during processing. For example, organosilanes, polydiorganosiloxanes, or organosilazanes e.g. hexaalkyl disilazane, short chain siloxane diols or fatty acids or fatty acid esters such as stearates to render the filler(s) hydrophobic and therefore easier to handle and to obtain a homogeneous mixture with the other ingredients. Specific examples of the organosilicon compounds useful in the present invention may include, but are not restricted to, silanol terminated trifluoropropylmethyl siloxane; silanol terminated vinylmethyl (ViMe)siloxane; tetramethyldi(trifluoropropyl)disilazane; tetramethyldivinyl disilazane; silanol terminated methylphenyl (MePh) siloxane; liquid hydroxyl-terminated polydiorganosiloxane containing an average of from 2 to 20 repeating units of diorganosiloxane in each molecule; hexaorganodisiloxane; hexaorganodisilazane; and mixtures thereof. In another embodiment, a small amount (e.g., less than about 10 wt %) of water can be added to the base composition together with the silica treating agent(s) as a processing aid.

The base composition may include one or more optional additives but the total weight % of the composition should total 100 wt %; and the alkenyl and/or alkynyl content of the polydiorganosiloxane gum should be determined using, for example, quantitative infra-red analysis in accordance with ASTM E168.

The base composition as described herein can be cured using a curing agent selected from either (i) a peroxide curing agent in an amount of from 0.3 to 3% wt. and/or (ii) a hydrosilylation cure package comprising (1) an organohydrogenpolysiloxane having 3 or more silicon-bonded hydrogen atoms per molecule and (2) a hydrosilylation catalyst.

The curing agent may be a single peroxide curing agent or a mixture of two or more different types of peroxide curing agents. The peroxide curing agent or mixtures of curing agents may be any of the well-known commercial peroxides used to cure fluorosilicone elastomer compositions. The amount of organic peroxide used is determined by the nature of the curing process, the organic peroxide used, and the fluorosilicone elastomer base used. These considerations are well-known to those skilled in the art of fluorosilicone elastomers. Typically, the amount of peroxide curing agent utilized in a composition as described herein is from 0.3 wt % to 3 wt %, alternatively, from 0.3 wt % to 2 wt %, in each case based on the weight of the composition.

Any suitable organic peroxide may be utilized in the composition. Exemplary of some organic peroxides useful in the present invention include benzoyl peroxide; 1,4-dichlorobenzyl peroxide; 2,4-dichlorobenzyl peroxide; 2,4-dichlorobenzoyl peroxide; 1,4-dimethylbenzyl peroxide; 2,4-dimethylbenzyl peroxide; di-i-butyl peroxide; dicumyl peroxide; tertiary butyl-perbenzoate; monochlorobenzoyl peroxide; ditertiary-butyl peroxide; 2,5-bis-(tertiarybutyl-peroxy)-2,5-dimethylhexane; 1,1-bis(t-butylperoxy)-3,3,5-trimethylcyclohexane; tertiary-butyl-trimethyl peroxide; n-butyl-4,4-bis(t-butylperoxy) valerate; 1,1-bis(t-butylperoxy)-3,3,5-trimetylcyclohexane; t-butylperoxyisopropylcarbonate; t-butyl perbenzoate; and mixtures thereof.

The organohydrogenpolysiloxane(s), which operate(s) as cross-linker(s) for polydiorganosiloxane gum will undergo a hydrosilylation (addition) reaction by way of its silicon-bonded hydrogen atoms with the alkenyl groups in the polydiorganosiloxane gum catalysed by one or more hydrosilylation catalysts discussed below. The organohydrogenpolysiloxane normally contains 3 or more silicon-bonded hydrogen atoms per molecule so that the hydrogen atoms of this ingredient can sufficiently react with the alkenyl groups of polydiorganosiloxane gum (a) to form a network structure therewith and thereby cure the composition.

The molecular configuration of the organohydrogenpolysiloxane is not specifically restricted, and molecular configuration of the organohydrogenpolysiloxane can be straight chain, branch-containing straight chain, or cyclic. While the molecular weight of this ingredient is not specifically restricted, the viscosity is typically from 0.001 Pa·s to 50 Pa·s at 25° C. as measured using a Brookfield DV-III Ultra Programmable Rheometer for viscosities ≥50,000 mPa·s, and using a Brookfield DV 3T Rheometer for viscosities less than 50,000 mPa·s, unless otherwise indicated.

The organohydrogenpolysiloxane is typically added in an amount such that the molar ratio of silicon bonded hydrogen atoms to vinyl (Vi) groups in the composition is from 0.75:1 to 2:1. Examples of the organohydrogenpolysiloxane can include but are not limited to: trimethylsiloxy-terminated methylhydrogenpolysiloxane; trimethylsiloxy-terminated polydimethylsiloxane-methylhydrogensiloxane; dimethylhydrogensiloxy-terminated dimethylsiloxane-methylhydrogensiloxane copolymers; dimethylsiloxane-methylhydrogensiloxane cyclic copolymers; copolymers composed of $(CH_3)_2HSiO_{1/2}$ units and $SiO_{4/2}$ units; and copolymers composed of $(CH_3)_3SiO_{1/2}$ units, $(CH_3)_2HSiO_{1/2}$ units, and $SiO_{4/2}$ units; and mixtures thereof.

When the aforementioned cross-linkers are present in the composition, the amount used can be within the range described above, i.e. dependent on the molar ratio of silicon bonded hydrogen atoms to Vi groups discussed above but in terms of weight %, the cross-linkers can be typically present in the composition in an amount somewhere within the approximate range of 2 wt % to 10 wt % based on the weight of the composition but this may vary depending on the cross-linker chosen.

As hereinbefore described the composition can be cured via a hydrosilylation reaction catalyzed by a hydrosilylation (addition cure) catalyst that can be a metal selected from the platinum metals, i.e. platinum, ruthenium, osmium, rhodium, iridium and palladium; or a compound of such metals. The metals can include platinum, palladium, and rhodium but platinum and rhodium compounds are preferred embodiments due to the high activity level of these catalysts for hydrosilylation reactions.

Examples of hydrosilylation catalysts useful in the present invention include, but are not limited to, platinum black; platinum on various solid supports; chloroplatinic acids; alcohol solutions of chloroplatinic acid; complexes of chloroplatinic acid with ethylenically unsaturated compounds such as olefins; organosiloxanes containing ethylenically unsaturated silicon-bonded hydrocarbon groups; and mixtures thereof. In other embodiments, the catalyst can be platinum metal; platinum metal deposited on a carrier, such as silica gel or powdered charcoal; a compound or complex of a platinum group metal; and mixtures thereof.

Examples of suitable platinum-based catalysts useful in the present invention may include: (i) complexes of chloroplatinic acid with organosiloxanes containing ethylenically unsaturated hydrocarbon groups, for example as described in U.S. Pat. No. 3,419,593; (ii) chloroplatinic acid, either in hexahydrate form or anhydrous form; (iii) a platinum-containing catalyst which is obtained by a method comprising reacting chloroplatinic acid with an aliphatically unsaturated organosilicon compound, such as divinyltetramethyldisiloxane; (iv) alkene-platinum-silyl complexes, for example, as described in U.S. Pat. No. 6,605,734 such as $(COD)Pt(SiMeCl_2)_2$ where "COD" is 1,5-cyclooctadiene; and/or (v) Karstedt's catalyst, a platinum divinyl tetramethyl disiloxane complex typically containing about 1 wt % of platinum in a solvent, such as toluene, for example as described in U.S. Pat. Nos. 3,715,334 and 3,814,730.

In general, the hydrosilylation catalyst is present in the total composition in a catalytic amount, i.e., an amount or quantity sufficient to promote a reaction or curing thereof at desired conditions. Varying levels of the hydrosilylation catalyst can be used to tailor reaction rate and cure kinetics. The catalytic amount of the hydrosilylation catalyst can be generally from 0.01 ppm (parts by weight of platinum-group metal, per million parts (ppm)) to 10,000 ppm, based on the combined weight of the components in the composition, if the latter is present; alternatively, from 0.01 ppm to 5,000 ppm; alternatively, from 0.01 ppm to 3,000 ppm, and alternatively from 0.01 ppm to 1,000 ppm. In other embodiments, the catalytic amount of the catalyst may range from 0.01 ppm to 1,000 ppm, alternatively 0.01 ppm to 750 ppm, alternatively 0.01 ppm to 500 ppm and alternatively 0.01 ppm to 100 ppm of metal based on the weight of the composition. The ranges may relate solely to the metal content within the catalyst or to the catalyst altogether (including its ligands) as specified, but typically these ranges relate solely to the metal content within the catalyst. The catalyst may be added as a single species or as a mixture of two or more different species. Typically, dependent on the form/concentration in which the catalyst package is provided the amount of catalyst present can be within the range of from 0.001 wt % to 3.0 wt % based on weight of the composition.

Optional additives may be present in the composition depending on the intended use of the curable silicone elastomer composition. For example, when the composition is cured via hydrosilylation, inhibitors designed to inhibit the reactivity of the hydrosilylation catalysts may be utilized. Examples of still other additives that may be present in the composition as and when required depending on the intended use of the curable silicone elastomer composition can include non-reinforcing fillers, electrically conductive fillers, thermally conductive fillers, non-conductive filler, pot life extenders, flame retardants, pigments, coloring agents, adhesion promoters, chain extenders, heat stabilizers, compression set improvement additives and mixtures thereof.

Where the optional additives may be used for more than one reason e.g. as a non-reinforcing filler and flame retardant, when present they may function in both roles. When or if present, the aforementioned additional ingredients are cumulatively present in an amount of from 0.1 wt % to 30 wt %, alternatively of from 0.1 wt % to 20 wt % based on the weight of the composition.

For peroxide cure systems the base composition of the present invention may be prepared by combining all of ingredients at ambient or elevated temperature excepting the peroxide. The peroxide may then be added in a suitable form to form an uncured silicone rubber compound. Any suitable mixing techniques and devices described in the prior art can be used for this purpose. The particular device to be used will be determined dependent on the viscosities of ingredients and the final curable composition. Suitable mixers include but are not limited to paddle type mixers and kneader type mixers. Cooling of ingredients during mixing may be desirable to avoid premature curing of the composition.

The order for mixing the ingredients of the composition is not critical in the present invention. For example, the gum and filler components of the composition may be mixed together before introducing the other ingredients in the composition. In the case of hydrosilylation cure compositions, these are typically stored in two or more parts before use in order to keep the catalyst and cross-linker separate prior to use to avoid premature cure. When present inhibitor is usually stored in the same part as the cross-linker. Typically, there are in two parts, often referred to as Part A which comprises polymer, filler and a hydrosilylation catalyst and Part B which will contain polymer, usually filler, cross-linker and inhibitor. The other optional additives may be split between Part A and Part B as considered appropriate.

Once all the individual ingredients are mixed together prior to cure; the mixture or the composition can be cured. The composition may be cured by any conventional curing means known in the art. The composition may be cured by heating at any suitable temperature, for example, from room temperature to 250° C., typically dependent on the curing agent(s) being used. In the case of a peroxide curing agent cure will take place at a temperature between from 70° C. to 250° C., alternatively from 80° C. to 225° C., alternatively from 90° C. to 200° C. The temperature for curing via hydrosilylation however is typically from 25° C. to 150° C., alternatively from 40° C. to 150° C., and alternatively from 50° C. to 130° C.

The first layer can have any workable thickness desired and can depend on the materials selected for the first and second layers of the insulation coating. Generally, the thickness of the first layer can be selected based on the thickness and the material selected for the second layer. As one broad embodiment and not to be limited thereby, when the second layer is any of the exemplary second layer materials described herein below, the thickness of the first silicone-containing layer can be in the range of from 0.4 cm to 3.7 cm in one embodiment; from 1.6 cm to 3.7 cm in another embodiment; and from 1.8 cm to 3.7 cm in still another embodiment. As an illustration of the present invention and not to be bound thereby, when the second layer is GSPU and the first layer is HCR, the thickness of the first layer can be from 2.7 cm to 3.7 cm in one embodiment, and from 2.3 cm to 3.3 cm in another embodiment; and from 1.8 cm to 3.0 cm in still another embodiment.

The second layer of the multilayer coating can be at least one second layer of a material bondable to (i.e., capable of being bonded to) the first layer. Exemplary of such bondable materials include a polyurethane-containing material such as polyurethane (PU), glass syntactic polyurethane (GSPU), polypropylene (PP), glass syntactic polypropylene (GSPP), polyethylene (PE), hydrogenated nitrile butadiene rubber (HNBR), epoxy, and mixtures thereof. In a preferred embodiment, the second layer can be GSPU.

As aforementioned, one of the purposes of using the GSPU as the second layer is to provide mechanical protection. The second layer can have any workable thickness desired to accomplish such purpose. The thickness of the second layer can depend on the materials selected for the first and second layers of the insulation coating. As an illustration and not to be limited thereby, the thickness of any of the exemplary second layers described above can be, for example, in the range of from 2.2 cm to 5.8 cm in one general embodiment; from 3.4 cm to 4.5 cm in another embodiment; and from 2.2 cm to 4.0 cm in still another embodiment. As an illustration of the present invention and not to be bound thereby, when the second layer is GSPU and the first layer is HCR, the thickness of the second layer can be from 1 cm to 6.0 cm in one embodiment, from 2.0 cm to 4.0 cm in another embodiment, from 2.2 cm to 4.0 cm in still another embodiment, from 2.2 cm to 3.5 cm in yet another embodiment; from 2.2 cm to 3.5 cm in even another embodiment, from 2.5 cm to 3.5 cm in even still another embodiment, from 2.2 cm to 3.2 cm in even yet another embodiment, and from 2.9 cm to 3.2 cm in still another embodiment.

One objective of the present invention is to increase the bond strength of the silicone-containing first layer (e.g., HCR) bonded to the second layer (e.g., GSPU) by altering the surface of the first layer by applying a flame surface treatment on at least a portion of the HCR surface. For example, a high temperature (e.g., up to 3,000° C.) flame treatment at ambient conditions can be used for treating the surface of the HCR.

In one broad embodiment, the process for producing a multilayer coating product for a substrate such that the insulation coating has an increased bond strength and such that the insulation coating can be used as an insulation protection coating, especially for subsea operations, includes the steps of: (a) applying a flame surface treatment on at least a portion of the surface of a first layer silicone-containing material such as an HCR layer to form an "activated" surface area on at least a portion of the surface of the HCR; and (b) bonding the flame treated surface of the first layer silicone-containing material such as an HCR layer to at least a portion of the surface of a second layer polyurethane (PU)-containing material such as a GSPU layer such that an effective bond is formed between the first and second layers (e.g., the HCR and the GSPU layers) to form a multilayer layer insulation coating.

In a preferred embodiment, the process for producing the above multilayer insulation coating for a substrate such as a metal substrate or a metal pipe. The process can include the following steps of: (a) applying a flame surface treatment on at least a portion of the surface of a HCR layer to form an "activated" surface area on at least a portion of the surface of the HCR; wherein the flame treatment used for treating the HCR is carried out at a temperature and at ambient conditions sufficient to bring reactive radicals to the surface of HCR surface and sufficient to induce polarized components on the HCR surface such that the surface is "activated" and such that the polarized components on the HCR can interact with the components in a GSPU layer in preparation for adhering the GSPU layer on the surface of the HCR layer; and (b) bonding the "activated" HCR surface to the GSPU layer such that an effective bond is formed between the HCR and the GSPU layers to form a multilayer layer insulation coating.

With reference to FIG. 1, there is shown a general flow chart of one embodiment of a process for producing a multilayer (e.g., a dual layer) coating structure. In the process shown in FIG. 1, a cured HCR layer is used and the process includes, for example, the steps of: applying an uncured HCR layer onto a substrate shown as step 11; curing the HCR layer on the substrate shown as step 12; flame treating, via step 13, the surface of the cured HCR layer from step 12 to activate the surface of the HCR layer wherein the flame treatment can be carried out for a period of time from 3 seconds (s) to 10 s; applying, casting or molding, via step 14, an uncured GSPU (e.g., polyol and isocyanate) layer to the cured activated HCR layer after the passage of a period of 5 minutes (min) to 10 min; and curing, via step 15, the uncured GSPU layer by heating the uncured GSPU layer together with the already cured activated HCR layer to form a strong bond between the HCR layer and the GSPU layer. The process shown in FIG. 1 has provided some success in providing a useful insulation coating for metal substrates such as metal pipes.

The flame treatment used for treating the HCR can be carried out at ambient conditions or room temperature. For example, the treatment can be carried out at a temperature of from −20° C. to 50° C. in one embodiment; and the flame temperature for the treatment can be at a temperature of from 1,550° C. to 3,000° C. in one embodiment, and from 1,960° C. to 2,526° C. in another embodiment.

The flame treatment of the HCR layer is carried out for a sufficient time to bring reactive radicals to the surface of the HCR surface and induce polarized components on the HCR surface such that the "activated" surface can interact with components in a GSPU layer in preparation for adhering the GSPU layer to the surface of the HCR layer. Generally, the flame treatment can be applied from 2 s to 10 s in one embodiment, from 3 s to 9 s in another embodiment; from 3 s to 7 s in still another embodiment; and from 3 s to 5 s in yet another embodiment. In one preferred embodiment, the flame application can be carried out at the time periods described above once or the application can be repeated twice, thrice or as many times as desired to provide the desired bonding between the layers.

Once the HCR layer is flame treated, the "activated" HCR surface is contacted with the surface of the GSPU layer such that an effective bond is formed between the HCR and the GSPU layers to form a multilayer layer insulation coating. The contacting step can be carried out as follows: the polyol and isocyanate solutions are mixed and the mixture is poured onto the flame treated HCR layer at room temperature. Then, the dual layer sample is placed heated to fully cure the GSPU layer of the dual layer structure. For example, the GSPU layer can be cured at a temperature of from 70° C. to 90° C. in one embodiment.

The multilayer insulation coating for a substrate advantageously has an increased bond strength between the HCR layer and the GSPU layer after flame treatment. For example, the adhesion strength, as measured by a "90-degree peel test" method, can be in the range of from 2.10 Newtons/millimeter (N/mm) to 10.07 N/mm in one embodiment.

Exemplary of some other advantageous properties exhibited by the multilayer coating can include "flexibility", abrasion resistance, and shorter cycle time. For example, the flexural modulus of the insulation coating, as measured by ASTM D790, can be from 200 MPa to 2,000 MPa. For example, the flexural modulus of GSPU can be from 37 MPa to 2,220 MPa; and the flexural modulus of polypropylene can be from 1,300 MPa to 1,750 MPa The gel time of the GSPU layer can depend on the enduse of the bonded multilayer article and the requirements for such enduse. And, the gel time can depend on the time needed to fill the void in a mold. As an illustration of the present invention and not to be bound thereby, the gel time of the GSPU layer can be, for example, from 2 min to 8 min in one embodiment, from 3 min to 7 min in another embodiment, and from 3 min to 5 min in still another embodiment. If the gel time of the GSPU layer is less than 3 min, the GSPU will not be fully cured. A gel time of the GSPU layer longer than 8 min does not provide any further benefit since the GSPU layer be already fully cured.

In another broad embodiment, the present invention is directed to a bonded multilayer article including: (a) at least one first layer of a silicone-containing rubber substrate material bonded to (b) at least one second layer of a substrate material bondable to the first layer. The bonded multilayer article can be produced by a process including the steps of:

(i) applying at least one first layer of an uncured silicone-containing rubber substrate material to at least one second layer of an uncured substrate material bondable to the first layer;

(ii) flame treating at least a portion of the surface of the uncured first layer to activate the surface of the uncured first layer for adhering (bonding) the first layer to the second layer and for increasing the bond strength of the first layer to the second layer; and (iii) heating the multilayer article of step (ii) at a temperature sufficient to cure the uncured first layer and the uncured second layer and sufficient to bond the first layer to the second layer to form a bonded multilayer article.

In one preferred embodiment, the first layer of an uncured silicone-containing rubber substrate material used in the present invention can be, for example, an uncured HCR. Using an uncured silicone-containing rubber substrate material such as uncured HCR provides a simplified process for manufacturing the multilayer insulation material of the present invention; and can advantageously enhance the adhesion between a PU-containing material (e.g., GSPU layer) and a silicone-containing material (e.g., HCR layer). The uncured HCR can be used in the process of manufacturing a multilayer article, for example as illustrated in FIG. 2.

Figure 2:
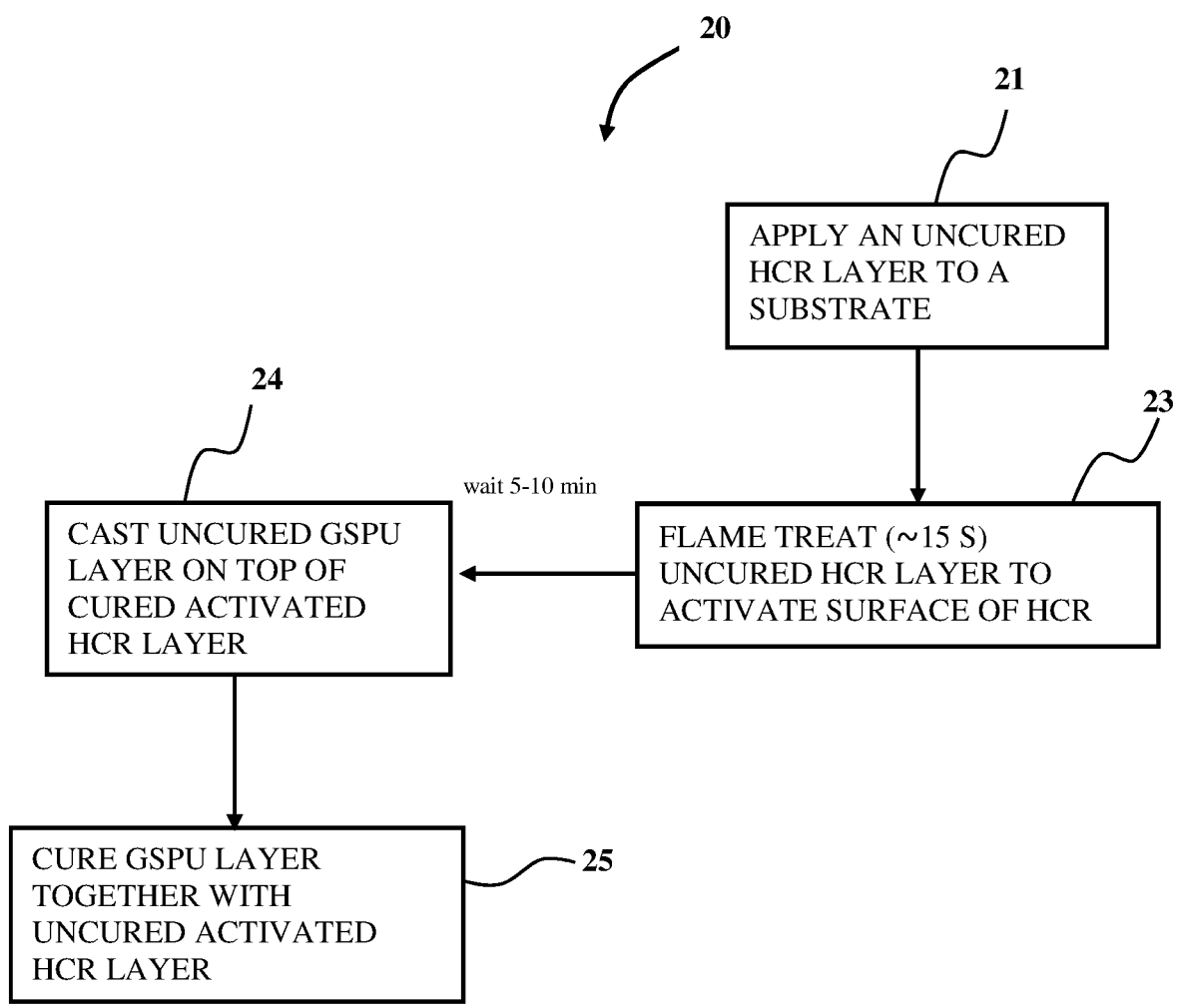
FIG. 2 is a schematic flow chart of a process of coating GSPU onto uncured HCR after flame treatment.

With reference to FIG. 2, there is shown a general flow chart of another preferred embodiment of a process for producing a multilayer (e.g., a dual layer) coating structure. In the process shown in FIG. 2, an uncured HCR layer is used and the process includes, for example, the steps of: flame treating, via step 23, the surface of an uncured HCR layer to activate the surface of the HCR layer wherein the flame treatment can be carried out for a period of time of up to 15 s; casting or molding, via step 24, a GSPU layer to the uncured activated HCR layer after the passage of a period of 5 min to 10 min; and (iii) curing, via step 25, the uncured GSPU layer by heating the uncured GSPU layer together with the uncured activated HCR layer to form a strong bond between the HCR layer and the GSPU layer.

When an uncured HCR is used to provide a useful multilayer insulation coating, in another embodiment the process for producing a dual layer coating can include, for example, the steps of: (a') wrapping/extruding uncured HCR on pipes; (b') flame-treating the surface of the uncured HCR (e.g., 10-15 sec, the uncured HCR was found to have a better resistant to high temperature flame than a cured HCR); and (c') curing the uncured flame treated HCR layer and the uncured GSPU layer together (e.g., heating at 100° C. for 20 min).

The processing of a dual layer coating, for example, can be simplified from using multiple processing steps to using less processing steps. In one embodiment, a GSPU formula can be poured directly on an uncured HCR plaque to form the GSPU layer on the HCR layer. It has been found that material degradation (e.g., discoloration of PU) can occur at the GSPU/HCR interface. Such degradation can be hypothesized to be caused by reactions between PU components and the curing agent (e.g., peroxide) in HCR.

Therefore, to stop PU degradation, simplify the coating procedure, and potentially shorten the processing time in producing a coating, one preferred embodiment of the process of the present invention, shown in FIG. 2, includes flame-treating an uncured HCR to initiate the curing of the HCR surface, which reduces the amount of peroxide on the HCR surface. Then, a GSPU formula can be poured onto the treated HCR to cure the two layers together.

As described in Table X-XV in the examples herein, it has been surprisingly found that flame-treating an uncured HCR leads to greatly improved adhesion between GSPU and HCR (i.e., a bonding strength of up to 4 times higher than when using a process including the step of flame-treating a cured HCR). The process of the present invention also provides a multilayer insulation coating on a pipe substrate that can ensure a proper oil flow in the pipe (oil temperature >150° C., sea water temperature approximately (~) 4° C.). The multilayer coating includes for example the high consistency silicone rubber (HCR) as the inner layer; and the glass syntactic polyurethane (GSPU) as the protection layer.

The multilayer article of the present invention can be useful in various forms such as films, coating and devices; and the multilayer article can be used for various application that would benefit from such multilayer article such as a coating. In one preferred embodiment, the above multilayer insulation material can be used as a thermal insulation coating for pipes and other equipment which can be exposed to high temperatures. Thus, in one embodiment, a metal pipe or pipeline containing the multilayer thermal insulation coating of the present invention can be prepared and used accordingly as described herein.

The pipeline substrate can be made of, for example, metal, rubber, plastic, composites, and combinations thereof. For example, the metal of the pipeline can include low carbon steel, and corrosion resistant alloys (e.g., chrome, nickel, or aluminum).

In a preferred embodiment, the pipeline coated with the above-described multilayer insulation material can include a pipeline coated with a predetermined thickness of a multilayer insulation coating based on the above multilayer approach of high temperature vulcanized (HTV) silicone rubber and polyurethane. An extrudable grade of HCR can be used as the inner layer up to an optimized thickness that would essentially reduce the temperature to a level where a GSPU layer can withstand the high temperature offshore operations. The insulated metal pipe can be used for extracting offshore oil from the sea bottom at high temperatures (e.g., from 150° C. up to 180° C.). In addition, the resulting coated pipeline's overall flexibility can be increased without compromising the pipeline's operating temperature. The pipeline's extra flexibility can enable the coated pipe to be used in a reel-lay operation which is not feasible with other prior art pipe products. The present invention also provides a cost-effective coated pipe with the use of a GSPU layer.

In one general embodiment, the metal pipe or pipeline coated with the multilayer insulation coating of the present invention can be produced by a process including the steps of: (I) providing a pipeline substrate, and (II) forming the multilayer coating on the pipeline substrate. The various pipelines of various substrates are readily available to those skilled in the art.

The step of forming the multilayer insulation coating on the pipeline can be accomplished in several ways. For example, in one embodiment, the multilayer coating is formed on a steel pipeline substrate by contacting the multilayer coating on the pipeline under the following conditions: The steel pipe is coated with an epoxy based anti-corrosion coating. The epoxy based anti-corrosion coating is typically Intertherm 3070 or Phenguard 930 formulated systems for paint applications, and fusion bonded epoxy (FBE) for powder coating applications. An HCR is extruded and mandrel wrapped to a thickness between 5-35 mm. The pipe is heated to between 50-90° C. and the extruded HCR is wrapped around the outer surface of the pipe. The HCR wrapped pipe is then cured for ~20 min at 80° C. The outer surface of the HCR is then flame treated between 3 s to 10 s at a distance between 5-200 mm. The HCR wrapped pipe is then placed in a heated closed mold that is at a temperature of between 70-90° C. The GSPU is then dispensed into the mold with a fill time of no greater than 2-3 min and allowed to remain in the mold after fill for at least 15 min to thus complete the formed pipeline with a thermal insulation coating.

In a preferred embodiment, the present invention includes a process for producing a metal pipe coated with the multilayer insulation coating of HCR and GSPU on the metal pipe including the steps of: (i) applying a flame surface treatment on at least a portion of the HCR surface; wherein the flame treatment used for treating the HCR is carried out at a temperature of from 1,550° C. up to 3,000° C. and at ambient conditions sufficient to bring reactive radicals to the surface of HCR surface and sufficient to induce polarized components on the HCR surface such that the surface is "activated" that can interact with components in GSPU in preparation for adhering GSPU on the surface of the HCR; (ii) bonding the "activated" HCR surface to the GSPU layer such that an effective bond is formed between the HCR and the GSPU layers to form a multilayer layer insulation coating; and (iii) applying the multilayer layer insulation coating from step (ii) to at least a portion of the surface of a metal pipe.

In another preferred embodiment of the process for producing the multilayer (e.g., a dual layer structure) insulation coating on a metal substrate such as a pipe for subsea applications, the process steps can include, for example, a first step of (a) wrapping/extruding a cured or uncured HCR on a pipe substrate. In a preferred embodiment an uncured HCR is used. However, if in step (a) a cured HCR is used, a second step of (b) flame-treating the surface of the cured HCR is performed (e.g., 3-10 seconds (s), the cured HCR tends to burn if flame treatment is longer than 10 s). After flame treatment, the GSPU on top of the flame-treated HCR is then mold casted (e.g., heating at 80° C. for 20 min) in a third step (c).

Adhesion between the above two layers can be achieved by applying flame treatment on a cured HCR surface. However, because of the complexity of the known multiple step processes (even for processing a dual layer coating) and the time consumed during each step of the processes, another objective of the present invention is to provide a better way to simplify and expedite the coating process of the present invention.

In one embodiment, the present invention provides a coating insulation having increased thermal properties, a method of manufacturing the coating insulation, a method of coating a pipeline with the coating insulation, and an improved coated pipeline formed by the method of coating the pipeline.

The pipe coated with the insulation of the present invention has several beneficial properties and performances. For example, the insulated pipe can be used in a high temperature environment without the insulation degradation such as when hot oil from a sea bottom flows through the interior of a pipeline. The temperature can be for example from 80° C. to 200° C. in one embodiment, from 110° C. to 180° C. in another embodiment, and from 140° C. to 180° C. in still another embodiment.

Exemplary of some other advantageous properties exhibited by the insulated pipeline of the present invention can include properties similar to the properties of the multilayer insulation coating such as "flexibility" and abrasion resistance which can be partially attributable to the coating.

The multilayer coating product manufactured as described herein can be used in various applications where the coating will be exposed to high temperature environments; and the coating will be thermally stable when subjected to elevated temperatures such that the coating will maintain its structural integrity and not undergo any detrimental thermal and mechanical problems. For example, the coating can be used as a thermal insulation protection coating for pipelines and structures, such as pipelines and structures used in the field of subsea pipelines and structures. In one embodiment, coating of the present invention is useful as thermal insulation material for thermally insulating pipelines and associated equipment, structures, and objects used in offshore oil drilling, offshore oil drilling equipment and structures, particularly subsea pipelines and structures.

Another objective of the present invention is to use the pipeline coated with the above multilayer insulation material for offshore deep water oil drilling and provide a process for recovering oil from the bottom of a seabed including the steps of: (I) recovering oil from a reservoir located underneath the sea bottom ground by flowing the oil from the reservoir located in the sea bottom ground through a metal pipeline coated with a multilayer insulation coating of HCR and GSPU on the metal pipeline to the surface of the sea; and (II) collecting the oil in the pipeline by transferring the oil from the metal pipeline into a storage reservoir at the surface of the sea.

In a preferred embodiment, the multilayer coating may be applied to the surface of a pipeline used in subsea operations such as offshore oil drilling processes. The subsea operations include recovering oil from an oil reservoir (or oil well) located underneath the ground of the sea bottom and bringing the oil to the top of the sea via a pipeline, typically, using an offshore drilling unit or platform situated on the surface of the sea water to carry out the subsea oil drilling operations. Typically, the drilling units can drill in deep water, e.g., in water depths up to and more than 10,000 ft. The process of using the coated pipeline includes the steps of:

(I) recovering oil from a reservoir located underneath the sea bottom ground by flowing the oil from the reservoir located in the sea bottom ground through a metal pipeline coated with a multilayer insulation coating of HCR and GSPU on the metal pipeline to the surface of the sea; and (II) collecting the oil in the pipeline by transferring the oil from the metal pipeline into a storage reservoir at the surface of the sea.

The multilayer insulation coating of HCR and GSPU on the metal pipeline can be the multilayer coating described above. Typically, the oil beneath the sea bottom can be very hot, for example, at a temperature of up to 204° C.; however, the coated metal pipeline is protected by the multilayer coating/insulation. The hot oil flows through the pipeline up through the sea water which cannot be at a temperature of below 60° C. until the pipeline reaches the platform situated on the surface of the sea water. The oil from the pipeline can then be collected in storage tanks situated on top of the platform; or the oil can be delivered to onshore oil facilities.

EXAMPLES

The following examples, illustrating the compositions and components of the compositions, elastomers, and methods, are presented to further illustrate the present invention in detail but are not to be construed as limiting the scope of the claims. Unless otherwise stated all parts and percentages are by weight.

Various raw materials (ingredients or components) used in the Inventive Examples (Inv. Ex.) and the Comparative Examples (Comp. Ex.) which are described herein as follows:

High Consistency Rubber containing silicone gums and treated fillers are called bases. Bases plus curatives are called compounds. Unless otherwise indicated Williams plasticity for each gum was determined in accordance with ASTM D-926-08. All viscosities measured were done so at 25° C. relying on the cup/spindle method of ASTM D 1084 Method B, with the most appropriate spindle from the Brookfield® RV or LV range for the viscosity range, unless otherwise indicated. The alkenyl and/or alkynyl and/or Si—H content of polymers was determined using quantitative infra-red analysis in accordance with ASTM E168.

Coefficient of friction values and other physical property results for the respective compositions/elastomers, together with the test methods used, are described in Tables 1b (C1-C4), Table 1d (Ex. 1 to Ex. 5) and Table 1f (Ex. 6 to Ex. 9). The static and kinetic coefficient of friction measurements were made using a Labthink MXD-02 machine in accordance with test method GB 10006. These tables provide evidence that compositions as hereinbefore described using gums as polymers (i) and (ii) fall within the scope of this disclosure.

Some of the materials used in the Examples are described as follows:

Silicone Gum G1: Dimethylvinyl-terminated dimethyl Siloxane gum having a having a Williams plasticity of 154 mm/100 and a vinyl content of 0.01 wt %.

Silicone Gum G2: Dimethylvinyl-terminated Dimethyl, Methylvinyl Siloxane gum having a Williams plasticity of 155 mm/100 and a vinyl content of 0.06 wt %.

Silicone Gum G3: Dimethylvinyl-terminated Dimethyl, Methylvinyl Siloxane gum having a Williams plasticity of 154 mm/100 and a vinyl content of 0.22 wt %.

Silicone Gum G4: Dimethylvinyl-terminated dimethyl Siloxane gum having a Williams plasticity of 135 mm/100 and a vinyl content of 0.72 wt %.

Silicone Fluid F1: Dimethylvinyl-terminated Dimethyl, Methylvinyl Siloxane having a viscosity of 150,000 mPa·s at 25° C. and a vinyl content of 7.5 wt %.

Silicone Fluid F2: Dimethyl, Methylvinyl, Siloxane with Methylphenyl silsesquioxane having a viscosity of 1500 mPa·s at 25° C. and a vinyl content of 5 wt %.

Silicone Fluid F3: Tetramethyltetravinylcyclotetrasiloxane.

Silicone Crosslinker X1: Trimethyl-terminated Dimethyl, Methylhydrogen Siloxane Fluid, having a viscosity of 5 mPa·s at 25° C. and a hydrogen content of 0.76 wt %.

Silicone Crosslinker X2: Trimethyl-terminated Dimethyl, Methylhydrogen Siloxane Fluid, having a viscosity of 3,400 mPa·s at 25° C. and a hydrogen content of 0.027 wt %.

Silicone Crosslinker X3: 50% Silicone Crosslinker H1 in silicone carrier.

Additive A1: 60% Manganese 2-Ethylhexanoate in naphtha.

Additive A2: 50% ceric hydroxide in a silicone carrier.

Additive A3: 3% masterbatch of magnesium oxide in a silicone rubber carrier.

Peroxide P1: Bis-(2,4-dichlorobenzoyl) peroxide, 50% concentration in silicone oil.

Peroxide P2: Dicumyl Peroxide, 25% concentration in silicone oil.

Platinum Catalyst P3: A catalyst, which was a solution composed of 0.2 percent by weight of platinum-siloxane complex prepared from platinum dichloride and 1,3-divinyltetramethyldisiloxane according to method described in U.S. Pat. No. 5,175,325, and 98 percent by weight of vinyldimethylsiloxy-terminated polydimethylsiloxane having the viscosity of 0.19 Pa·s at 25° C. and 1.8 percent by weight of 1,3-divinyltetramethyldisiloxane, to have platinum content of 1000 ppm.

Platinum Catalyst P4: 12% Catalyst C3 in silicone carrier.

Base B1: 63-72 wt % Silicone Gum G3 and 27-34 wt % treated silica.

Base B2: 21-25 wt % Silicone Gum G3 31-37 wt % Silicone Gum G2, and 27-33 wt % treated silica.

Base B3: 48-66 wt % Silicone Gum G2 and 33-48 wt % treated silica.

Base B4: 52-64 wt % Silicone Gum G2, 0.9-2.0 wt % Silicone Fluid F2 and 34-42 wt % treated silica.

Base B5: 50-60 wt % Silicone Gum G1, 3.0-6.2 wt % Silicone Gum G4, 0.7-1.5% Silicone Fluid F1, 0.01 wt % Additive A3, and 31-42% treated silica.

Base B6: 45-50 wt % Silicone Gum G1, 4.2-6.6 wt % Silicone Gum G2, 0.8-1.4% Silicone Fluid F1 and 37-51% treated silica.

Base B7: 39-59 wt % Silicone Gum G1, 6-9 wt % Silicone Gum G4, 2.4-3.2% Silicone Crosslinker X1, 0.02 wt % Additive A3, and 30-46% treated silica.

Compound C1: 100 parts Base B1, 1 part Additive A2, 1 part Additive A3, 1.2 parts Peroxide P1.

Compound C2: 100 parts Base B2, 1 part Additive A3, 1.2 parts Peroxide P1.

Compound C3-7: 100 parts of the respective Base B3 to 7, 1 part Additive A2, 1 part Additive A3, 1.2 parts Peroxide P1.

Compound C8: 100 parts Base B1,1 part Additive A2, 2.5 parts Peroxide P2.

Examples 1-5 and Comparative Examples A-E

General Procedure for Preparing a Multilayer Article (Inventive Examples)

In general, the process for producing a multilayer insulation coating for a substrate having an increased bond strength includes the steps of (a) applying a flame surface treatment on at least a portion of the surface of a HCR layer; wherein the flame treatment used for treating the HCR is carried out at a temperature and at ambient conditions sufficient to bring reactive radicals to the surface of HCR surface and sufficient to induce polarized components on the HCR surface such that the surface is "activated" that can interact with components in a GSPU layer in preparation for adhering the GSPU layer on the surface of the HCR layer; and (b) bonding the "activated" HCR surface to the GSPU layer such that an effective bond is formed between the HCR and the GSPU layers to form a multilayer layer insulation coating.

Step (a)—The Flame Treatment Step

The flame treatment step of the HCR layer can be carried out with a flame of an Arcogas Flame Treater Equipment Type FTS 101 DR with a DB 100n burner (available from Arcotec). The surface of the cured or uncured HCR layer substrate was contacted with the flame for a period of time of 2 s to 15 s from a distance of 5 mm to 200 mm from the surface.

Step (b)—The Bonding Step

In preparation for the adhesion procedure, a formulation of the GSPU material is first prepared by mixing the following components: HYPERLAST™ Syntactic DW 512/300E Polyol (a polyol available from The Dow Chemical Company) and HYPERLAST LE 5013/LP 5013 Isocyanate (an isocyanate available from The Dow Chemical Company). The polyol and isocyanate components were mixed at a polyol:isocyanate ratio of, for example, 2.2:1 by weight.

Then, after the flame treatment of step (a) above, the GSPU formulation of was spread over the flame treated surface of the HCR layer by pouring the formulation from a beaker into a mold adapted onto the surface of the HCR layer.

The resulting combined components of the GSPU formulation on the HCR was then cured at a temperature of from 80° C. to 100° C.; and the resulting multilayer article was subjected to the various tests described herein.

Modeling the Layer Thickness of the Multilayer Article (Inventive Example)

Figure 3:
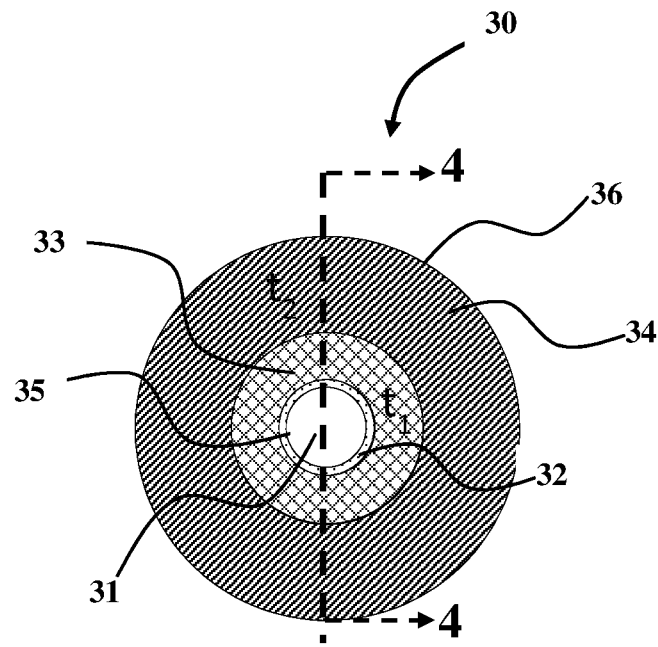
FIG. 3 is a schematic diagram showing a front cross-sectional view of a multilayer coated pipeline.
Figure 4:
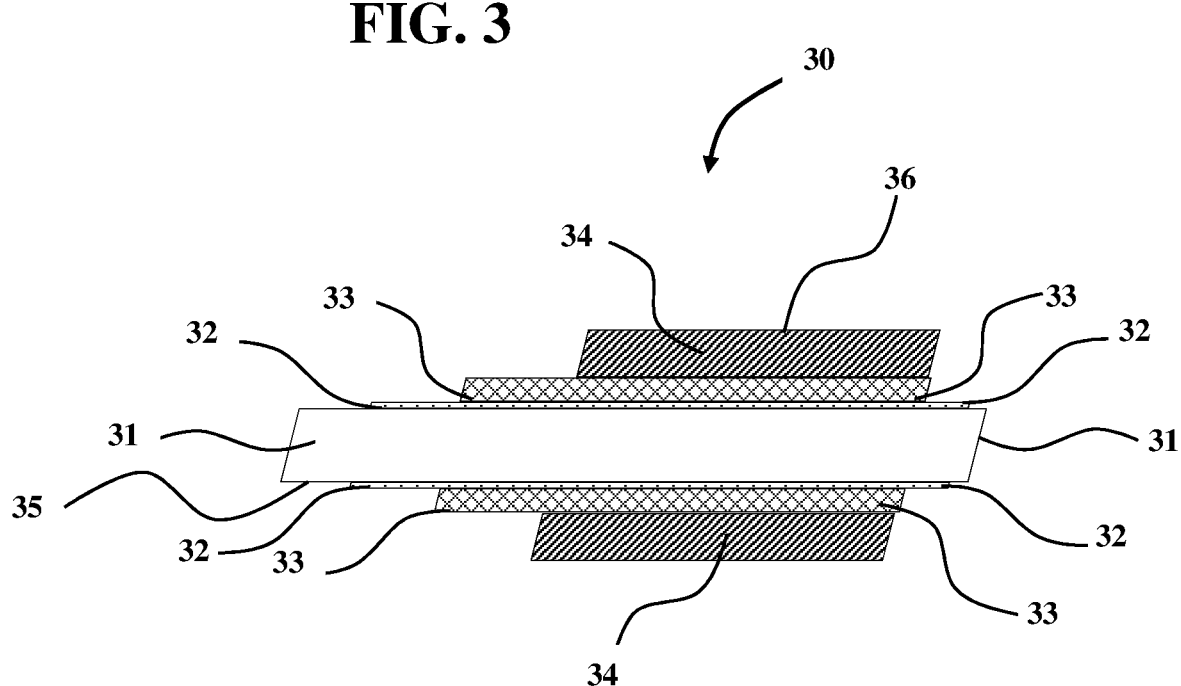
FIG. 4 is a schematic diagram showing a side cross-sectional view of the multilayer coated pipeline shown in FIG. 3 taken along line 4-4.

In FIGS. 3 and 4, there is shown a schematic structure of a metal pipeline insulated with a multilayer insulation coating; the structure, generally indicated by numeral 30, includes a pipeline substrate 31 with a corrosion protection coating 32. To the top surface of the corrosion protection coating 32, the multilayer insulation coating of the present invention can be applied. The multilayer insulation coating at a minimum includes an HCR layer 33 and a GSPU layer 34.

As shown in FIG. 3, the multilayer insulation coating on the pipeline 31, has a temperature gradient when exposed to the various temperatures of a subsea operation. For example, a first temperature $T_1$ can be located at the outer surface 35 of the pipeline, and $T_1$ can be, for example, ~180° C. A second temperature $T_2$ can be located at the surface 36 of the GSPU coating layer 14 which is also the temperature of the seawater; and $T_2$ can be, for example, ~4° C. In one embodiment, the thickness $t_1$ of the silicone layer can be 28 mm; and the thickness $t_2$ of the GSPU layer can be 30 mm.

The following Table I summarizes some of the parameters used to model the subsea environment in which the coated insulated pipeline of the present invention can be used. Table I describes several multilayer articles having an HCR layer of varying thicknesses and a GSPU layer of varying thicknesses.

TABLE I

| Thickness of HCR and GSPU Layers at Different Interface Temperature | | | | | |
|---|---|---|---|---|---|
| Pipe Surface Temperature, $T_1$, (° C.) | Seawater Temperature, $T_2$, (° C.) | GSPU/HCR Interface Temperature (° C.) | Total Thickness (inches) | HCR Layer Thickness, $t_1$, (inches) | GSPU Layer Thickness, $t_2$, (inches) |
| 180 | 4 | 70 | 2.3 (58 mm) | 1.3 (33 mm) | 1.0 (25 mm) |
|  |  | 85 | 2.3 | 1.1 (28 mm) | 1.2 (30 mm) |
|  |  | 100 | 2.3 | 0.9 (23 mm) | 1.4 (35 mm) |

Several beneficial properties and performances of the various layers can be obtained by the present invention. For example, it has been found that the silicone rubber shows: (1) thermal stability at extreme temperatures; (2) physical stability based on polymer type; (3) good environmental resistance to UV rays, fluid, and ocean water; (4) low thermal conductivity with high specific heat; (5) easy coating (extrudable, hand applied, or wrappable); and (6) flexible enough to enable reel barge installation. The GSPU material has excellent thermal insulation, corrosion protection, adhesion, and impact strength; and is durable in harsh working environments. For example, the GSPU material shows: (1) flexibility to enable reel barge installation; (2) low processing temperatures; (3) mold or rotationally cast; (4) various water depth capabilities; (5) various catalyst versions available; (6) excellent adhesion to anti-corrosion coated steel substrate; (7) minimal change in thermal conductivity and coating thickness under hydrostatic pressure; and (8) very low water absorption. It has also been found that: (1) the adhesion of the HCR layer to the GSPU layer can be increased with the bonding process of the present invention; and (2) the HCR layer can readily bond to the anti-corrosion coated steel substrate (i.e., the HCR layer can adhere to steel in, for example, construction applications).

Aging Test of HCR Vs. Liquid Silicone Rubber (LSR)

Table II describes the results of initial physical properties testing and fluid resistance testing of seven different Compounds ("C1"-"C7") (different HCR bases) used in the coating of the present invention at high temperature hot wet conditions. Table III describes the results of initial physical properties of the LSR, a conventional material used in subsea insulation, and fluid resistance testing at hot wet conditions. From the results described in Table II and III, it was determined that Compound C1 and Compound C2 had minimal changes in physical properties in hot wet conditions for three weeks; and (2) showed enhanced stability compared to the LSR. LSR is available from The Dow Chemical Company.

Property data was obtained by testing 1.91 mm (0.075 inch thick) slabs; as molded 5 minutes at 120° C. Shore A Durometer was measured using ASTM D2240. Tensile, MPa, and Elongation, %, were measured using ASTM D412 Die C. Fluid resistance was measured using ASTM D471. Tensile bars were hung in distilled water at 170° C. for 1 week, 2 weeks, and 3 weeks in sealed Parr Vessels. Week 1, 2, and 3 physical properties were measured on room temperature wet samples after immersion.

TABLE II

Tensile Data for Aging of the HCR Sample (Inv. Ex. 1a and 1b)

| | | Inv. Ex. 1a Compound C1 | Inv. Ex. 1b Compound C2 | Compound C3 | Compound C4 | Compound C5 | Compound C6 | Compound C7 |
|---|---|---|---|---|---|---|---|---|
| Durometer Shore A | Initial | 47.8 | 59.7 | 61.1 | 65.2 | 57.7 | 59.5 | 46.1 |
| | 7 day | 51.6 | 70.8 | 64.4 | 67.3 | 63.1 | 61.6 | 58.3 |
| | 14 day | 51.0 | 69.9 | 62.1 | 66.6 | 60.3 | 57.4 | 58.0 |
| | 21 day | 51.8 | 71.6 | 62.1 | 63.7 | 57.4 | 61.4 | 45.7 |
| Tensile MPa | Initial | 5.7 | 8.1 | 9.8 | 9.5 | 9.4 | 9.3 | 8.6 |
| | 7 day | 5.4 | 5.7 | 4.3 | 4.6 | 3.2 | 2.7 | 1.8 |
| | 14 day | 5.2 | 5.9 | 1.5 | 1.8 | 1.5 | 1.6 | 1.1 |
| | 21 day | 4.6 | 4.6 | 0.0 | 0.1 | 0.7 | 0.4 | 0.1 |
| Elongation % | Initial | 307 | 254 | 419 | 337 | 582 | 539 | 774 |
| | 7 day | 339 | 275 | 360 | 322 | 252 | 142 | 68 |
| | 14 day | 312 | 284 | 117 | 110 | 66 | 34 | 22 |
| | 21 day | 296 | 231 | 0 | 2 | 8 | 3 | 3 |

TABLE III

Tensile Data for Aging of the LSR Sample (Comp. Ex. A)

| Aging Duration (days) | Elongation at Break (%) | Tensile Strength (MPa) |
|---|---|---|
| 0 | 418.5 | 10.1 |
| 7 | 24.9 | 21.4 |
| 14 | 32.5 | 20.9 |
| 21 | 17.2 | 21.4 |

Effect of Flame Treating a Cured HCR on Adhesion

1. Cured HCR to GSPU Adhesion

When testing the sample without flame treatment, the HCR layer and the GSPU layer can be easily separated after the two layers were taken out of the mold. Therefore, it was concluded that only slight adhesion took place between the HCR layer and the GSPU layer. On the other hand, when testing the sample with flame treatment, the GSPU layer and the HCR layer stuck to each other after the two layers were taken out of the mold. Therefore, it was concluded there was the presence of adhesion.

One way to measure the adhesion strength between GSPU and HCR layers is a 900 peel test according to ASTM D6862. In this test, a 1 inch (25.4 mm) wide stripe of the two-layer substrate was tested using an electromechanical test frame INSTRON 5566. The bottom GSPU layer was gripped by a metal fixture and kept flat during the test. The top HCR layer was peeled off from the GSPU layer at 10 mm/min. As shown in Table IV-VI, the peel strength of the HCR:GSPU sample with flame treatment is about 4-18 times of the sample without flame treatment, suggesting flame treatment significantly improves the adhesion between HCR and GSPU.

The HCR samples tested were cured for 10 minutes at 120° C. The Samples described in Table IV were made with Compound C1. The Samples described in Table V were made with Compound C2. The Samples described in Table VI were made with Compound C8.

TABLE IV

90 Degree Peel Results of Cured HCR to GSPU

| Example | Sample | Flame Treatment? | Average Load/Width (Peel Strength, N/mm) |
|---|---|---|---|
| Inv. Ex. 2 | Cured HCR to GSPU | Yes | 3.64 ± 2.56 |
| Comp. Ex. B | Cured HCR to GSPU | No | 0.22 ± 0.16 |

TABLE V

90 Degree Peel Results of Cured HCR to GSPU

| Example | Sample | Flame Treatment? | Average Load/Width (Peel Strength, N/mm) |
|---|---|---|---|
| Inv. Ex. 3 | Cured HCR to GSPU | Yes | 5.30 ± 2.00 |
| Comp. Ex. C | Cured HCR to GSPU | No | 0.48 ± 0.02 |

TABLE VI

90 Degree Peel Results of Cured HCR to GSPU

| Example | Sample | Flame Treatment? | Average Load/Width Peel Strength, N/mm |
|---|---|---|---|
| Inv. Ex. 4 | Cured HCR to GSPU | Yes | 2.10 ± 0.60 |
| Comp. Ex. D | Cured HCR to GSPU | No | 0.50 ± 0.08 |

2. Cured HCR to PU Adhesion

As shown in Table VII, the peel strength of the HCR:PU sample with flame treatment determined during the 90 degree peel test is higher than that of the HCR:PU sample without flame treatment, suggesting flame treatment improves the adhesion between HCR and PU as well. The HCR samples were cured for 10 minutes at 120° C. The Samples described in Table VII were made with Compound C1.

TABLE VII

90 Degree Peel Results of Cured HCR to PU

| Example | Sample | Flame Treatment? | Average Load/Width Peel Strength, N/mm |
|---|---|---|---|
| Inv. Ex. 5 | Cured HCR to PU | Yes | 0.57 |
| Comp. Ex. E | Cured HCR to PU | No | No adhesion |

A review of the results described in Table IV-VII shows that the peel strength of the HCR:GSPU sample with flame treatment determined during the 90 degree peel test is much higher than that of the HCR:PU sample with flame treatment, suggesting glass beads in GSPU can significantly improve the adhesion.

Effect of Flame Treating an Uncured HCR on Adhesion

Adhesion tests were carried out for the HCR:GSPU sample without flame treatment (Comparative Example F) and a HCR:GSPU sample prepared with flame treatment (Inventive Example 6).

For the HCR:GSPU sample without flame treatment, almost no adhesion was found between the GSPU layer and the HCR layer. The GSPU layer can be easily peeled off from the HCR layer by hand. In addition, a discoloration of the GSPU layer (dark brown) was found at the interface of the HCR:GSPU sample without flame treatment, indicating that undesired reactions occurred at the interface during the curing process leading to potential material degradation. For the HCR:GSPU sample with flame treatment, the GSPU layer and the HCR layer adhered tightly to each other after the sample was cured. When the HCR layer was peeled from GSPU plaque in a peel test, the HCR layer tended to tear itself (portions of the HCR plaque stuck to the GSPU plaque). Such behavior indicates that the adhesion strength between the HCR layer and the GSPU layer is stronger than the mechanical strength of HCR itself, demonstrating the presence of a strong adhesion between the HCR plaque and the GSPU plaque.

Table VIII describes the peak loads results from the 90 degree peel test of HCR:GSPU samples where one sample included flame-treating an uncured HCR material and another sample included an uncured HCR material without flame treatment. The HCR:GSPU samples were cured for 20 minutes at 100° C. The Samples described in Table VIII were made with Compound C2.

TABLE VIII

90 Degree Peel Results of Uncured HCR to GSPU

| Example | Sample | Flame Treatment? | Peak Load/Width (Peel Strength, N/mm) |
|---|---|---|---|
| Inv. Ex. 6 | Uncured HCR to GSPU | Yes | 17.3 |
| Comp. Ex. F | Uncured HCR to GSPU | No | No adhesion |

Effect of Flame Treating an Uncured and Cured HCR on Adhesion

Flame-treating cured HCR:GSPU samples (Inventive Examples 7-13) and flame-treating uncured HCR:GSPU samples (Comparative Examples G-M) were prepared using the same procedure as described above.

Tables IX-XV describe the adhesion results from the 90 degree peel test of HCR:GSPU samples where one sample in each table includes flame-treating a cured HCR material and another sample in each table includes flame-treating an uncured HCR material. The HCR samples were cured for 10 minutes at 120° C. The Samples described in Table IX were made with Compound C2. The Samples described in Table X were made with Compound C3. The Samples described in Table XI were made with Compound C4. The Samples described in Table XII were made with Compound C5. The Samples described in Table XIII were made with Compound C6. The Samples described in Table XIV were made with Compound C7.

TABLE IX

90 Degree Peel Results of HCR to GSPU

| Example | Sample | Flame Treatment? | Average Load/Width (Peel Strength, N/mm) |
|---|---|---|---|
| Inv. Ex. 7 | Cured HCR to GSPU | Yes | 3.81 |
| Comp. Ex. G | Uncured HCR to GSPU | Yes | 7.44 |

TABLE X

90 Degree Peel Results of HCR to GSPU

| Example | Sample | Flame Treatment? | Average Load/Width Peel Strength, N/mm |
|---|---|---|---|
| Inv. Ex. 8 | Cured HCR to GSPU | Yes | 3.13 |
| Comp. Ex. H | Uncured HCR to GSPU | Yes | 4.12 |

TABLE XI

90 Degree Peel Results of HCR to GSPU

| Example | Sample | Flame Treatment? | Average Load/Width (Peel Strength, N/mm) |
|---|---|---|---|
| Inv. Ex. 9 | Cured HCR to GSPU | Yes | 3.12 |
| Comp. Ex. I | Uncured HCR to GSPU | Yes | 3.40 |

TABLE XII

90 Degree Peel Results of HCR to GSPU

| Example | Sample | Flame Treatment? | Average Load/Width (Peel Strength, N/mm) |
|---|---|---|---|
| Inv. Ex. 10 | Cured HCR to GSPU | Yes | 3.09 |
| Comp. Ex. J | Uncured HCR to GSPU | Yes | 4.64 |

TABLE XIII

90 Degree Peel Results of HCR to GSPU

| Example | Sample | Flame Treatment? | Average Load/Width (Peel Strength, N/mm) |
|---|---|---|---|
| Inv. Ex. 11 | Cured HCR to GSPU | Yes | 2.91 |
| Comp. Ex. K | Uncured HCR to GSPU | Yes | 10.07 |

TABLE XIV

90 Degree Peel Results of HCR to GSPU

| Example | Sample | Flame Treatment? | Average Load/Width Peel Strength, N/mm |
|---|---|---|---|
| Inv. Ex. 12 | Cured HCR to GSPU | Yes | 1.95 |
| Comp. Ex. L | Uncured HCR to GSPU | Yes | 2.74 |

TABLE XV

90 Degree Peel Results of HCR to GSPU

| Example | Sample | Flame Treatment? | Average Load/Width Peel Strength, N/mm |
|---|---|---|---|
| Inv. Ex. 13 | Cured HCR to GSPU | Yes | 2.82 |
| Comp. Ex. M | Uncured HCR to GSPU | Yes | 7.25 |

As shown in Table IX-XV, the average load/width data collected for the samples formed by flame-treating uncured HCR materials were about 1-4 times higher than that collected for the samples formed by flame treating cured HCR materials. Such difference demonstrates that the adhesion between GSPU and HCR of the sample formed using a flame-treated uncured HCR is stronger than the adhesion between GSPU and HCR of the sample formed using a flame-treated cured HCR.

Other embodiments of the present invention can include, for example, the following:

(1) A process for producing a bonded multilayer article including the steps of: (a) applying at least one first layer of a cured silicone-containing rubber substrate material to at least one second layer of an uncured substrate material bondable to the first layer; wherein the at least one first layer of a silicone-containing rubber substrate material comprises an uncured high consistency silicone rubber having a gum with a Williams plasticity of from 30 mm/100 to 300 mm/100 as measured in accordance with ASTM D-926-08; (b) flame treating at least a portion of the surface of the cured first layer to activate the surface of the uncured first layer for bonding the first layer to the second layer and for increasing the bond strength of the first layer to the second layer; and (c) heating the multilayer article of step (b) at a temperature sufficient to cure the uncured second layer and sufficient to bond the first layer to the second layer to form a bonded multilayer article.

(2) A process for producing a bonded multilayer article including a flame surface treatment step carried out at a temperature and period of time sufficient to bring reactive radicals to the surface of the first layer surface and sufficient to induce polarized components on the first layer surface such that the surface is activated; and wherein the activated surface can interact with components in the second layer surface sufficient to provide an effective bond between the first and second layers; and wherein the average bond strength between the first and second layers is from 0.57 N/mm to 10.07 N/mm; and wherein the bonded first and second layers provides an effective bonded multilayer article.

(3) The above process of (1), wherein the flame surface treatment step can be carried out at a temperature of from 1,550° C. to 3,000° C., at ambient conditions, and for a time period of from 2 seconds to 10 seconds to form a surface treated first layer.

(4) The above process of (1), wherein the applying step can be carried out at a temperature of from −20° C. to 50° C. and the heating step is carried out at a temperature of from 25° C. to 175° C. to form a bonded multilayer article.

(5) A process for recovering oil from the bottom of a seabed including the steps of: (I) recovering oil from a reservoir located underneath the sea bottom ground by extracting the oil from the reservoir located in the sea bottom ground to the surface of the sea through a metal pipeline coated with a multilayer insulation coating made by the process of (1) above; and (II) collecting the oil in the pipeline by transferring the oil from the metal pipeline into a storage reservoir at the surface of the sea.

(6) A bonded multilayer article including: (a) at least one first layer of a silicone-containing rubber substrate material bonded to (b) at least one second layer of a substrate material bondable to the first layer; wherein the bonded multilayer article is produced by the process of (1) above.

(7) A process for producing a metal pipe coated with insulation including the steps of:
(i) providing the above bonded multilayer article as a multilayer thermal insulation coating on a metal pipeline; and
(ii) bonding the multilayer layer insulation material of step (i) to at least a portion of the surface of the metal pipeline.

(8) A coated pipeline article used for offshore drilling comprising a pipeline coated with the above bonded multilayer article as a multilayer thermal insulation coating on the metal pipeline.

What is claimed is:

1. A bonded multilayer article comprising:
(a) at least one first layer of a silicone-containing rubber substrate material bonded to
(b) at least one second layer of a substrate material bondable to the first layer, the at least one second layer of a substrate being a glass syntactic polyurethane;
wherein the at least one first layer of a silicone-containing rubber substrate material comprises a high consistency silicone rubber having a gum with a Williams plasticity of from 30 mm/100 to 300 mm/100 as measured in accordance with ASTM D-926-08;
wherein the first layer has at least a portion of the surface of the first layer activated by a flame treatment for adhering (bonding) the first layer to the second layer and for increasing the bond strength of the first layer to the second layer; and
wherein the activated surface of the first layer, activated by a flame treatment, is bonded to the surface of the second layer, wherein the bond strength of the first layer bonded to the second layer is from 0.57 N/mm to 10.07 N/mm.

2. A bonded multilayer article according to claim 1, wherein the high consistency silicone rubber is an uncured high consistency silicone rubber.

3. The article of claim 1, wherein the high consistency silicone rubber has at least 15 weight percent of a silicone gum present with a vinyl content of from equal to or greater than 0.15 weight percent to 0.3 weight percent.

4. The article of claim 1, wherein first layer has a thermal stability of greater than 160° C. in water.

5. The article of claim 1, wherein the second layer is a cured substrate material or an uncured substrate material.

6. The article of claim 1, including further hollow glass microspheres.

7. The article of claim 1 comprising a multilayer thermal insulation coating for a metal pipeline.

8. A bonded multilayer article according to claim 1, wherein the high consistency silicone rubber is a cured high consistency silicone rubber.

9. A process for producing a bonded multilayer article comprising the steps of:
   (a) applying at least one first layer of a cured silicone-containing rubber substrate material to at least one second layer of an uncured substrate material bondable to the first layer; wherein the at least one first layer of a silicone-containing rubber substrate material comprises a cured high consistency silicone rubber having a gum with a Williams plasticity of from 30 mm/100 to 300 mm/100 as measured in accordance with ASTM D-926-08;
   (b) flame treating at least a portion of the surface of the cured first layer to activate the surface of the cured first layer for bonding the first layer to the second layer and for increasing the bond strength of the first layer to the second layer, the second layer comprising a glass syntactic polyurethane; and
   (c) heating the multilayer article of step (b) at a temperature sufficient to cure the uncured second layer and sufficient to bond the first layer to the second layer to form a bonded multilayer article, wherein the bond strength of the first layer bonded to the second layer is from 0.57 N/mm to 10.07 N/mm.

10. A process for producing a bonded multilayer article comprising the steps of:
   (a) applying at least one first layer of an uncured silicone-containing rubber substrate material to at least one second layer of an uncured substrate material bondable to the first layer, the at least one second layer of a substrate material being a glass syntactic polyurethane; wherein the at least one first layer of a silicone-containing rubber substrate material comprises an uncured high consistency silicone rubber having a gum with a Williams plasticity of from 30 mm/100 to 300 mm/100 as measured in accordance with ASTM D-926-08;
   (b) flame treating at least a portion of the surface of the uncured first layer to activate the surface of the uncured first layer for adhering (bonding) the first layer to the second layer and for increasing the bond strength of the first layer to the second layer; and
   (c) heating the multilayer article of step (b) at a temperature sufficient to cure the uncured first layer and the uncured second layer and sufficient to bond the first layer to the second layer to form a bonded multilayer article, wherein the bond strength of the first layer bonded to the second layer is from 0.57 N/mm to 10.07 N/mm.

* * * * *